(12) United States Patent
Koide

(10) Patent No.: US 6,760,973 B1
(45) Date of Patent: Jul. 13, 2004

(54) LASER WORKING METHOD AND METHOD FOR PRODUCING INK JET RECORDING HEAD

(75) Inventor: Jun Koide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/604,637

(22) Filed: Jun. 27, 2000

(30) Foreign Application Priority Data

| Jun. 30, 1999 | (JP) | ............................................ 11-184717 |
| Jun. 30, 1999 | (JP) | ............................................ 11-184766 |
| Jun. 30, 1999 | (JP) | ............................................ 11-184799 |
| Nov. 30, 1999 | (JP) | ............................................ 11-339335 |

(51) Int. Cl.[7] .................. B21D 53/76; B23K 26/08; G03B 27/54
(52) U.S. Cl. ............. 29/890.1; 219/121.6; 219/121.61; 219/121.69; 219/121.76; 347/47; 355/67
(58) Field of Search ................................ 29/890.1, 611, 29/25.35, 830, DIG. 21; 219/121.6, 121.61, 121.7, 121.71, 121.76, 121.69; 347/47; 355/67

(56) References Cited

U.S. PATENT DOCUMENTS

| 5,310,986 | A | * | 5/1994 | Zumoto et al. | .......... 219/121.7 |
| 5,656,186 | A | * | 8/1997 | Mourou et al. | ......... 219/121.69 |
| 5,657,539 | A | * | 8/1997 | Orikasa et al. | ............. 29/890.1 |
| 5,684,566 | A | * | 11/1997 | Stanton | ........................ 355/67 |
| 5,796,415 | A | | 8/1998 | Inoue et al. | ................... 347/45 |
| 5,811,754 | A | * | 9/1998 | Nakatani et al. | ...... 219/121.7 X |

FOREIGN PATENT DOCUMENTS

| JP | 02-121842 | 5/1990 |
| JP | 02-121845 | 5/1990 |
| JP | 4-339585 | * 11/1992 ............... 219/121.7 |

* cited by examiner

Primary Examiner—A. Dexter Tugbang
(74) Attorney, Agent, or Firm—Fitzpatrick, Cella, Harper & Scinto

(57) ABSTRACT

A laser working method, for conducting laser ablation working on a workpiece by irradiating the workpiece with a laser beam, includes the following steps. In working by projecting a mask pattern with the laser beam, a laser beam of plural pulses having a very high energy density in space and time, emitted from a laser oscillator that can oscillate with a pulse radiation time of 1 picosecond or less, is employed. Scanning illumination is conducted by relative movement of a source of the laser beam and the mask pattern. The relative movement between the source of the laser beam and the mask pattern may be conducted by a reciprocating movement in a direction perpendicular to an optical axis of the laser beam, asynchronously with laser oscillation, and a form of the mask pattern may be formed stepwise and in succession on the workpiece.

36 Claims, 10 Drawing Sheets

LASER WORKING METHOD AND METHOD FOR PRODUCING INK JET RECORDING HEAD

BACKGROUND OF THE INVENTION

1. Field of the Invention

The present invention relates to a laser working method, for example, a method for producing with such laser working method an ink jet recording head for discharging ink droplets and depositing such ink droplets on a recording medium, an ink jet recording head or a micromachine produced with such method, and a laser working method capable of fine working of complex material or complex shape such as an IC or a hybrid IC.

2. Related Background Art

For fine working of a structured article requiring a fine structure and high precision, there has been employed a laser working method employing an ultraviolet laser.

Such fine working can be exemplified by working of ink flow paths and ink discharge ports of an ink jet recording head.

The Japanese Patent Application Laid-Open No. 2-121842 and No. 2-121845 disclose high precision working of forming ink flow paths and ink discharge ports with an excimer laser which is a representative ultraviolet laser. The excimer laser is capable of emitting ultraviolet light of a short pulse (15 to 35 ns) by discharge excitation of mixed gas of rare gas and halogen gas, with an oscillation energy of several hundred mJ/pulse and a pulse repeating frequency of 10 to 500 Hz. When the surface of polymer surface is irradiated with a short-pulsed ultraviolet light of such high intensity, there is generated an ablative photodecomposition (APD) process in which the irradiated portion instantaneously decomposes and scatters with a plasma light emission and an impact sound, whereby so-called laser ablation working of polymer resin is made possible.

Among the conventional lasers employed for such working, the widely employed YAG laser can form a hole but generates a coarse edge face, while the $CO_2$ laser emitting infrared light is associated with a drawback of generating a crater around the formed hole. Such laser working methods are laser thermal working in which the working is achieved by converting optical energy into thermal energy, so that the shape of the workpiece (the object to be worked) is often destructed and fine working is difficult to achieve. On the other hand, the laser ablation working utilizing the excimer laser, based on sublimation etching by a photochemical reaction breaking the covalent bond of carbon atoms, does not easily destruct the shape of the workpiece and can therefore achieve working of very high precision.

The laser ablation working method means a working method by sublimation, not through a liquid phase, by a laser.

Particularly in the field of ink jet technology, it is well known that the technology has undergone a remarkable progress to the present state by the adoption of the laser ablation working technology utilizing such excimer laser.

With the practical adoption of such laser working technology with excimer laser, there have been found the following phenomena.

The pulse oscillation time of the irradiating laser is about several ten nanoseconds in case of the excimere laser which is an ultraviolet laser or about 100 picoseconds to several nanoseconds in case of an ultraviolet laser of high frequency oscillation of the YAG laser, but all the laser beam falling on the workpiece is not consumed for cleaving the covalent bonds of the atoms.

Because of the presence of such optical energy not consumed in cleaving the covalent bonds of the atoms, the laser worked portion of the workpiece scatters before being completely decomposed, thereby forming by-products around the working area.

Also a part of the optical energy not consumed in cleaving the covalent bonds of the atoms is converted into thermal energy.

Also, as the energy density of the excimer laser remains at the level of 100 megawatts at maximum in the oscillation pulse, the subliming ablation working is not easily applicable to the materials of high thermal conductivity such as metals, ceramics or mineral substances (such as silicon) or materials of low light absorption such as quartz or glass but can principally employed for organic resins.

These phenomena are unavoidable in using the excimer laser, and various technologies have been proposed to avoid the influences of these phenomena on the actual ink jet head.

For example, a step of removing the by-products is conducted, since the ink discharge ports may be clogged if the ink jet recording head is assembled while such by-products still remain.

Also, as the conversion of a part of optical energy into thermal energy may cause thermal expansion or partial fusion of the workpiece in the course of working, there is employed a material of a high glass transition point or a reduced working pitch.

Besides, since these technologies do not fundamentally resolve these phenomena, there are practically encountered various limitations in conducting the laser working.

On the other hand, a higher definition in the image quality is being requested for the ink jet recording head, and the density of arrangement of the ink discharge ports or the ink flow paths, conventionally in a range of 300 to 400 dpi, is now requested to be elevated to 600 dpi or even 1200 dpi.

Therefore, there is requested a method capable of forming the discharge ports and the ink flow paths with a small pitch or a small dimension, such as an arrangement pitch of 50 $\mu$m or less and a working diameter of 20 $\mu$m or less, with a high precision. However the above-mentioned phenomena associated with the exciver laser become more conspicuous as the working pitch or the working diameter becomes smaller, and are posing limitations in producing the ink jet head of high precision as mentioned above.

In consideration of the foregoing, the present inventor, having recognized that the aforementioned phenomena are based on the laser ablation working utilizing the ultraviolet laser exemplified by the excimer laser, and have made intensive investigations not restricted in the field of the conventional technologies and have reached a novel laser ablation technology that is capable of fundamentally resolving these phenomena, also adapting to the fine working technologies ever advancing hereafter and also expanding the adaptability to various applications.

SUMMARY OF THE INVENTION

In consideration of the foregoing, an object of the present invention is to provide a laser working method free from generation of by-products and fundamentally avoiding accumulation of thermal energy, generated in the course of laser working, in the workpiece such as a resin, thereby achieving highly precise working without fusion or thermal expansion of the workpiece, a method for producing an ink jet recording head utilizing such laser working method, and an ink jet recording head produced by such producing method.

Another object of the present invention is to provide a laser working method capable of forming a fine structure in a workpiece composed of plural materials by a simple working step, a method for producing an ink jet recording head utilizing such laser working method, and an ink jet recording head produced by such producing method.

Still another object of the present invention is to provide a laser working method capable of simplifying an alignment step, improving the precision such as the positional precision of an internally structured member and reducing the manufacturing cost, a method for producing an ink jet recording head utilizing such laser working method, and an ink jet recording head produced by such producing method.

Still another object of the present invention is to provide a laser working method capable of improving the working efficiency by constructing the workpiece so as to absorb the radiation energy of laser, a method for producing an ink jet recording head utilizing such laser working method, and an ink jet recording head produced by such producing method.

Still another object of the present invention is to provide a laser working method capable of preventing speckle interference and reducing the damage by the laser beam on the mask, thereby enabling the working of a workpiece by projection of a large-area pattern, a method for producing an ink jet recording head utilizing such laser working method, and an ink jet recording head produced by such producing method.

Still another object of the present invention is to provide a method for producing an ink jet recording head, capable of suppressing speckle interference and effecting laser working from the outer side of an ink discharge port forming plate (from the ink discharge side) to form a tapered shape that is symmetrical with respect to the axis of ink discharging direction and gradually thinning toward the end and capable of easily forming a tapered shape, tapering toward the end, with a uniform and large tapering angle or with a uniform and variable tapering angle, an ink jet recording head produced by such producing method and a laser working method.

The above-mentioned objects can be attained, according to the present invention, by a laser working method, a method for producing an ink jet recording head utilizing such laser working method, and an ink jet recording head produced by such producing method, featured as described in the following items (1) to (37):

(1) A laser working method for conducting laser ablation working on a workpiece by irradiating the workpiece with laser beam, comprising the steps of:
in working by projecting a mask pattern with laser beam, employing laser beam of plural pulses having a very high energy density in space and time, emitted from a laser oscillator that can oscillate with a pulse radiation time of 1 picosecond or less; and
conducting scanning illumination by a relative movement of a source of the laser beam and the mask pattern.

(2) The laser working method according to item (1), wherein the relative movement between the source of the laser beam and the mask pattern is conducted by a reciprocating movement in a direction perpendicular to the optical axis of the laser beam, asynchronously with the laser oscillation, and the form of the mask pattern is formed stepwise and in succession on the workpiece.

(3) The laser working method according to item (2), wherein the relative movement between the source of the laser beam and the mask pattern is conducted by moving the mask relative to the laser beam.

(4) The laser working method according to item (3), wherein the mask comprises a rolled film bearing a predetermined pattern, and the movement of the mask pattern is achieved by feeding the rolled film by winding means and rewinding means into the optical path of the laser beam.

(5) The laser working method according to item (3) or (4), wherein the ablation working of the workpiece is conducted by moving the workpiece in a direction perpendicular to the optical axis of the laser beam, in synchronization with the movement of a pattern image from a projection lens, resulting from the movement of the mask.

(6) The laser working method according to any of items (1) to (3), wherein the projection magnification of the projection lens which projects the mask is $1/20$ or less in the absolute value.

(7) The laser working method according to item (2), wherein the relative movement between the source of the laser beam and the mask pattern is conducted by scanning illumination of the mask pattern by the laser beam.

(8) The laser working method according to item (7), wherein the scanning illumination is conducted by illuminating light comprising laser beam from a laser oscillator condensed on the mask through a deflection scanning device and which is asynchronous with the laser oscillation.

(9) The laser working method according to item (8), wherein the laser working is conducted by scanning illumination through an optical system which converts the laser beam from the laser oscillator into a ring-shaped beam.

(10) The laser working method according to item (9), wherein the optical system for converting the laser beam from the laser oscillator into the ring-shaped beam comprises mutually opposed lenses of a conical shape and the distance of the mutually opposed conical lenses is rendered variable in the direction of optical axis, whereby the external shape of the ring-shaped beam can be expanded or contracted.

(11) The laser working method according to item (1), wherein the wavelength of the laser beam is within a range of 350 to 1000 nm.

(12) The laser working method according to item (1), wherein the pulse radiation time of the laser beam is 500 femtoseconds or less.

(13) The laser working method according to item (1), wherein the workpiece comprises a resin, Si or an Si compound.

(14) The laser working method according to item (1), wherein the laser oscillator is provided with a light propagation space compressing device.

(15) The laser working method according to item (14), wherein the light propagation space compressing device comprises chirping pulse generation means and vertical mode synchronization means utilizing the optical wavelength dispersion characteristics.

(16) The laser working method according to item (14), wherein the light propagation space compressing device is composed by a vertical mode synchronization method utilizing the optical wavelength dispersion characteristics of chirping pulse generation means and a diffraction phase grating.

(17) A method for producing an ink jet recording head comprising an ink discharge port for discharging ink droplets to be attached to a recording medium, a liquid chamber for holding ink to be supplied to the ink discharge port, an ink flow path communicating the liquid chamber with the ink discharge port, an energy generation element provided in a part of the ink flow path and serving to generate energy for ink discharge, an ink supply aperture for ink supply from the outside to the liquid chamber, in which a member constituting at least a part of the ink flow path is worked by laser working, wherein:

the laser working, conducted by projecting a mask pattern with the laser beam, employs laser beam of plural pulses having a very high energy density in space and time, emitted from a laser oscillator that can oscillate with a pulse radiation time of 1 picosecond or less; and scanning illumination is conducted by a relative movement of a source of the laser beam and the mask pattern.

(18) The method for producing an ink jet recording head according to item (17), wherein the relative movement between the source of the laser beam and the mask pattern is conducted by a reciprocating movement in a direction perpendicular to the optical axis of the laser beam, asynchronously with the laser oscillation, and the shape of the mask pattern is formed stepwise and in succession on the workpiece.

(19) The method for producing an ink jet recording head according to item (18), wherein the relative movement between the source of the laser beam and the mask pattern is conducted by moving the mask relative to the laser beam.

(20) The method for producing an ink jet recording head according to item (19), wherein the mask comprises a rolled film bearing a predetermined pattern, and the movement of the mask pattern is achieved by feeding the rolled film by winding means and rewinding means into the optical path of the laser beam.

(21) The method for producing an ink jet recording head according to item (19) or (20), wherein the ablation working of the workpiece is conducted by moving the workpiece in a direction perpendicular to the optical axis of the laser beam, in synchronization with the movement of a pattern image from a projection lens, resulting from the movement of the mask.

(22) The method for producing an ink jet recording head according to any of items (17) to (19), wherein the projection magnification of the projection lens which projects the mask is 1/20 or less in the absolute value.

(23) The method for producing an ink jet recording head according to item (18), wherein the relative movement between the source of the laser beam and the mask pattern is conducted by scanning illumination of the mask pattern by the laser beam.

(24) The method for producing an ink jet recording head according to item (23), wherein the scanning illumination is conducted by illuminating light comprising laser beam from a laser oscillator condensed on the mask through a deflection scanning device and which is asynchronous with the laser oscillation.

(25) The method for producing an ink jet recording head according to item (24), wherein the laser working is conducted by scanning illumination through an optical system which converts the laser beam from the laser oscillator into a ring-shaped beam.

(26) The method for producing an ink jet recording head according to item (25), wherein the optical system for converting the laser beam from the laser oscillator into the ring-shaped beam comprises mutually opposed lenses of a conical shape and the distance of the mutually opposed conical lenses is rendered variable in the direction of optical axis, whereby the external shape of the ring-shaped beam can be expanded or contracted.

(27) The method for producing an ink jet recording head according to item (17), wherein the member constituting a part of the ink flow path comprises a recessed portion or a penetrating hole, and the recessed portion or the penetrating hole is simultaneously formed in plural units with a predetermined distance by laser beam irradiation through a mask having a pattern of plural apertures formed at a predetermined pitch.

(28) The method for producing an ink jet recording head according to item (27), wherein the recessed portion is a groove to constitute the ink flow path.

(29) The method for producing an ink jet recording head according to item (27), wherein the penetrating hole is to constitute the ink discharge port.

(30) The method for producing an ink jet recording head according to item (17), wherein the wavelength of the laser beam is within a range of 350 to 1000 nm.

(31) The method for producing an ink jet recording head according to item (17), wherein the pulse radiation time of the laser beam is 500 femtoseconds or less.

(32) The method for producing an ink jet recording head according to item (17), wherein a member constituting at least a part of the ink passage including the ink discharge port, ink flow path, liquid chamber and ink supply aperture comprises a resin.

(33) The method for producing an ink jet recording head according to item (17), wherein a member constituting at least a part of the ink passage including the ink discharge port, ink flow path, liquid chamber and ink supply aperture comprises Si or an Si compound.

(34) The method for producing an ink jet recording head according to item (17), wherein the laser oscillator is provided with a light propagation space compressing device.

(35) The method for producing an ink jet recording head according to item (34), wherein the light propagation space compressing device comprises chirping pulse generation means and vertical mode synchronization means utilizing the optical wavelength dispersion characteristics.

(36) The method for producing an ink jet recording head according to item (34), wherein the light propagation space compressing device is composed by a vertical mode synchronization method utilizing the optical wavelength dispersion characteristics of chirping pulse generation means and a diffraction phase grating.

(37) An ink jet head produced by the method for producing an ink jet recording head according to item (17).

DESCRIPTION OF THE PREFERRED EMBODIMENTS

Figure 1:
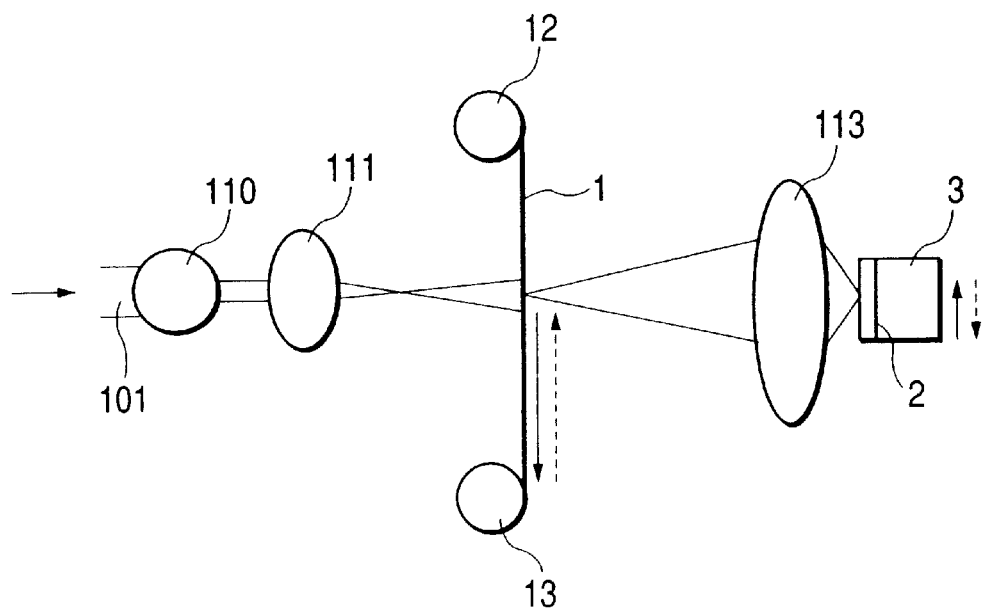
FIG. 1 is a schematic view of a laser working apparatus in Example 1 of the present invention.

Through the application of the aforementioned configurations of the present invention, embodiments thereof can realize a laser working method capable of achieving a higher definition, also avoiding generation of by-products and fundamentally preventing accumulation of thermal energy, converted in the course of laser working, in the workpiece composed for example of a resin, a method for producing an ink jet recording head utilizing such laser working method, and an ink jet recording head produced by such producing method. Also in mask projection working, by providing means for dynamically displacing interference of a projected image in the optical path for guiding the laser beam to the workpiece, there can be realized a laser working method capable of precisely forming a fine mask pattern, a method for producing an ink jet recording head utilizing such laser working method, and an ink jet recording head produced by such producing method.

The laser beam of plural pulses employed in the aforementioned configurations of the present invention and having a very high energy density in space and time, emitted from a laser oscillator that can oscillate with a pulse emission time of 1 picosecond or less is so-called femtosecond laser, described for example in the "Next generation optical technology summary" (published by Optronics Co. in 1992; Part 1 Elementary technologies: generation and compression of ultra short pulses; pp 24–31), and, among the currently commercially available femtosecond lasers, some have a pulse radiation time of 150 femtoseconds or less and an optical energy of 500 microjoules per pulse. With such lasers, the energy density of the emitted laser beam reaches about 3 gigawatts in the oscillated pulse.

In case of working, for example, an ink discharge port of an ink jet recording head with the conventional ablation working method utilizing an excimer laser, the optical energy absorbed by a resin plate employed for forming the discharge port is partly converted into thermal energy because of a long oscillated pulse duration of the irradiating laser beam, and such thermal energy diffuses with a certain thermal conductivity in the entire resin plate which thereby causes thermal expansion. The expansion increases with the progress of the etching process, whereby the nozzles are deflected to the outside and the nozzle edge becomes slumped so that the ink droplets cannot be discharged in parallel and straight manner.

On the other hand, a configuration employing the above-mentioned femtosecond laser having a pulse radiation time of 1 picosecond or less allows to drastically increase the energy density in time at the laser working, thereby ablation working the workpiece composed for example of a resin with a very low optical energy.

Also in the above-described configuration, since the by-products are scarcely generated in the laser working, there can be dispensed with the conventionally unavoidable step of removing the by-products, so that the productivity of the ink jet recording head can be remarkably improved.

Also in the above-described configuration, since the working can be completed before the optical energy of the laser beam irradiating the workpiece is converted into thermal energy and accumulated in the workpiece, it is relieved from thermal expansion in the course of laser working, resulting in deterioration of the working precision, or from partial melting, whereby the highly precise working is made possible and the performance of the ink jet recording head can be drastically improved. For example, by working the ink discharge ports with such configuration, there can be formed discharge ports arrayed with a high density in parallel manner, whereby obtained is the ink jet recording head capable of discharging ink droplets straight and parallel manner.

Also in the above-described configuration, by scanning illumination of the mask pattern asynchronously with the laser oscillation, there can be formed a pattern substantially identical with the mask pattern through integration of the speckle interference image generated by light diffraction when the laser beam passes through the mask pattern.

In a more specific form, an integrated image of the speckle interference image can be formed either by moving the mask in a direction perpendicular to the optical axis of the laser beam or by conducting scanning illumination of the mask pattern with the laser beam, through an optical system which converts the laser beam from the laser oscillator into a ring-shaped beam.

In such methods, since the mask pattern is illuminated by scanning asynchronous with the laser oscillation while the mask pattern is in a substantially fixed state, the working area in this system is inevitably limited in size. Since the system size is practically limited to about 20 cm (8 inches), the projection magnification of the mask pattern can only be set at $1/13$ at maximum in case of working an article with a size of about 15 mm.

Though the short-pulsed laser beam not exceeding 1 picosecond is capable of working almost any material, the energy density falling on the mask becomes $1/13 \times 1/13 = 1/169$ of that falling on workpiece because of the above-explained limitation, so that the material and working method of the workpiece are inevitably limited in consideration of the damage on the mask. Naturally the damage on the mask by laser irradiation is dependent on the materials of the mask and the workpiece, but certain limitation still remains in the selection of such materials, and the mask projection magnification has to be maintained at $1/20$ at minimum in order to prevent such limitation.

However, in another embodiment employing the aforementioned configurations of the present invention, there is employed a configuration of employing a mask consisting of a rolled film bearing a predetermined pattern thereon, selecting the projection magnification of the projection lens at $1/20$ or less in the absolute value, simultaneously moving the mask and the workpiece in a ratio matching such projection magnification in synchronous manner in a direction perpendicular to the optical axis and along the image forming direction (erect image or inverted image) of the projection lens, while moving the mask by winding means and rewinding means and conducting the ablation working of the workpiece by the laser beam, thereby working the workpiece by projection illumination of a large-area pattern while suppressing the speckle interference and reducing the damage on the mask by the laser beam.

In still another embodiment employing the aforementioned configurations of the present invention, in the optical system for guiding the laser beam to the workpiece, there is employed an optical system consisting of mutually opposed conical lenses for converting the laser beam from the laser oscillator into a ring beam for scanning illumination of the pattern of a photomask, thereby irradiating an orifice plate with the laser beam in the pattern of the photomask to form ink discharge ports. In this manner, by laser irradiation from the outer side of the orifice plate, it is rendered possible to easily form an ink discharge port of a tapered shape, gradually pointed toward the front end, on the outer side of the orifice plate, and to easily form a uniform shape with a large tapering angle. Also in such operation, the tapering angle of the inversely tapered shape can be arbitrarily changed by varying the distance of the aforementioned mutually opposed conical lenses.

In forming the tapered shape gradually pointed toward the front end, or namely the inversely tapered shape, on the outer side (ink discharge side) of the orifice plate, bearing the ink discharge ports, by optical working from such outer side with a laser capable of emitting laser beam of plural pulses with a pulse radiation time of 1 picosecond or less and normally having a Gaussian beam shape, the above-described configuration allows to easily overcome a drawback that the resulting inversely tapered shape has a small tapering angle or a drawback that the tapering angle can only be controlled by the irradiation intensity of the laser beam. In the conventional configuration, if the laser irradiation intensity is significantly changed from the predetermined value, an excessively low intensity is incapable of complete ablation of the orifice plate, whereby the by-products remain sticking on the worked area, while an excessively high intensity results in defects such as microcracks formed in the worked area of the orifice plate, but the above-described configuration allows to easily overcome such drawbacks.

Also with such formation of the ink discharge ports of the tapered shape, gradually pointed toward the front end, on the outer side of the orifice plate, the ink discharge ports can be formed in a final step after the assembling of the ink jet head, whereby avoided is the unevenness in the direction of the ink discharge nozzles, resulting from a deformation of the orifice plate in the assembling thereof. Also, by forming a tapered shape partially or entirely pointed toward the end on the outer side (ink discharge side) of the orifice plate, it is rendered possible to stabilize the discharging direction of ink droplets and to decrease the resistance for the ink flow, thereby increasing the ink flow speed. It is thereby made possible to increase the ink discharging frequency and the flying speed of the discharged ink with a same driving source, thereby significantly improving the print quality and enabling high-speed printing. In the following, Examples of the present invention will be explained with reference to the accompanying drawings, but the present invention is by no means limited by such embodiments.

(Example 1)

FIG. 1 is a schematic view showing the optical path of a laser working apparatus constituting Example 1 of the present invention. At first there will be explained, with reference to FIG. 1, the principal parts of the laser working apparatus of the present invention. Referring to FIG. 1, a laser beam 101, emitted in a direction indicated by an arrow from an unrepresented short-pulse laser, is guided to a zoom beam compressor 110 for converting into a predetermined beam diameter, then guided to a mask illuminating lens 111 for converting into a laser beam of a predetermined converging angle for illuminating a part of a mask pattern on a mask 1. The effective NA (numerical aperture) for finally working the workpiece is determined by the compression ratio of the zoom beam compressor 110 and the focal length of the mask illuminating lens 111. Such NA determines the worked shape of the workpiece, or, stated inversely, the compression ratio of the zoom beam compressor 110 and the focal length of the mask illuminating lens 111 are determined or regulated according to the worked shape of the workpiece.

Figure 2:
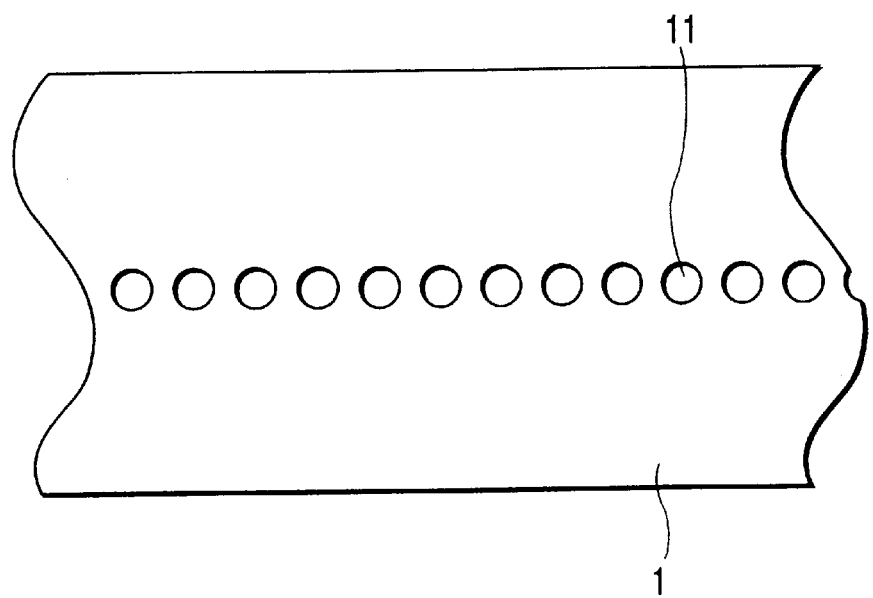
FIG. 2 is a view showing the configuration of a mask pattern in Example 1 of the present invention.

The laser beam passing through a mask pattern 11 of the mask 1 shown in FIG. 2 is focused and projected by a projection lens 113 which projects the image of the pattern on the surface of an orifice plate 2 of an ink jet head 3, constituting the workpiece, whereby an ink discharge port is formed by laser oscillation.

The mask 1, bearing a predetermined pattern on a rolled film, is put into a scanning motion by film winding means 13 and film rewinding means 12 simultaneously with the irradiation of the laser beam, and the ink jet recording head 3 including the orifice plate 2, constituting the workpiece, is moved, by an unrepresented mechanical stage, in a direction matching the image forming direction (erect image or inverted image) of the projection lens and perpendicular to the optical axis and at a predetermined speed matching the projection magnification of the projection lens, selected at $1/20$ or less in the absolute value and in synchronization with the mask. Thus the working is conducted while the mask 1 and the workpiece are reciprocated as indicated by solid-lined arrows and broken-lined arrows. Though there is employed a pulse oscillation laser, the mask is illuminated by repeatedly scannings asynchronous with the laser oscillation to average the mask pattern illumination by integration, thereby obtaining uniform illumination.

In a conventional simple optical system for simultaneously focusing and projecting the mask pattern, there is encountered a drawback that, since the irradiating laser beam is coherent with a laterally single mode, the lights diffracted in passing through the mask pattern mutually interfere to generate a speckle interference in the optical image of the mask pattern projected on the surface of the orifice plate, whereby the orifice plate cannot be worked in a shape corresponding to the mask pattern, but the above-described scanning of the mask 1 allows to resolve such drawback. More specifically, in the present Example, the laser beam does not pass through the entire mask pattern at the same time and the mask pattern is projected in continued manner in time in working the ink jet head, whereby the worked shape can be prevented from distortion by the speckle interference and can be made same as the mask pattern. Also the workpiece is put into a scanning movement simultaneously with and in synchronization with the scanning movement of the mask 1, so that the workpiece can be worked by projection of a pattern of a large (long) size, while there is reduced the damage by the laser beam on the workpiece and the mask, in addition to the suppression of the speckle interference.

(Example 2)

Figure 3:
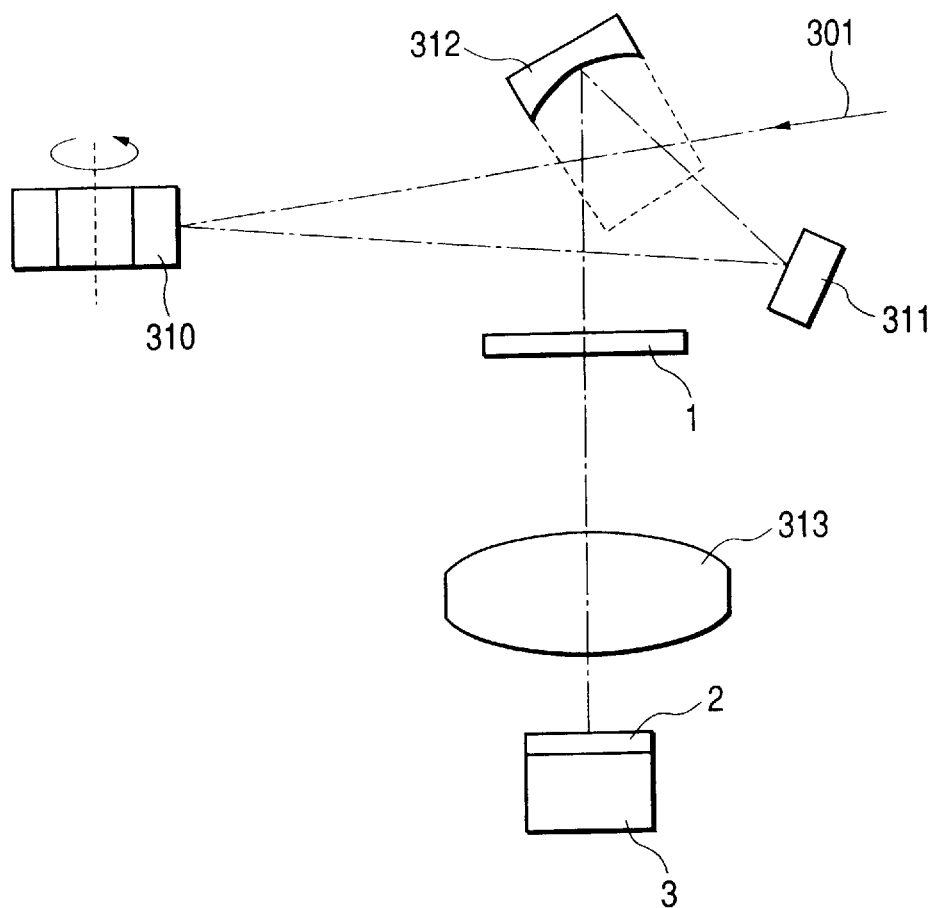
FIG. 3 is a schematic view showing the optical path of a mask pattern projecting optical system in a laser working apparatus of Example 2 of the present invention.

FIG. 3 is a schematic view showing the optical path of a mask pattern projecting optical system of a laser working apparatus in Example 2 of the present invention.

Referring to FIG. 3, a laser beam 301 emitted from an unrepresented laser is guided to a deflecting device 310 including a polygon mirror, wherein the entering laser beam is deflected by the rotary motion, indicated by an arrow, of the polygon mirror. The deflected light beam is reflected by a flat mirror 311 to a concave spherical mirror 312 which reflects and condenses the laser beam substantially on a mask 1, thereby illuminating a mask pattern shown in FIG. 5 by scanning.

The laser beam transmitted by the mask pattern of the mask 1 is focused and projected by a projection lens 313 onto the surface of an orifice plate 2 of an ink jet head 3 constituting the workpiece, whereby an ink discharge port is formed by laser oscillation. Though there is employed a pulsed laser, the repeated scanning illumination of the mask asynchronous with the laser oscillation averages the mask pattern illumination by integration, thereby obtaining uniform illumination.

Figure 4:
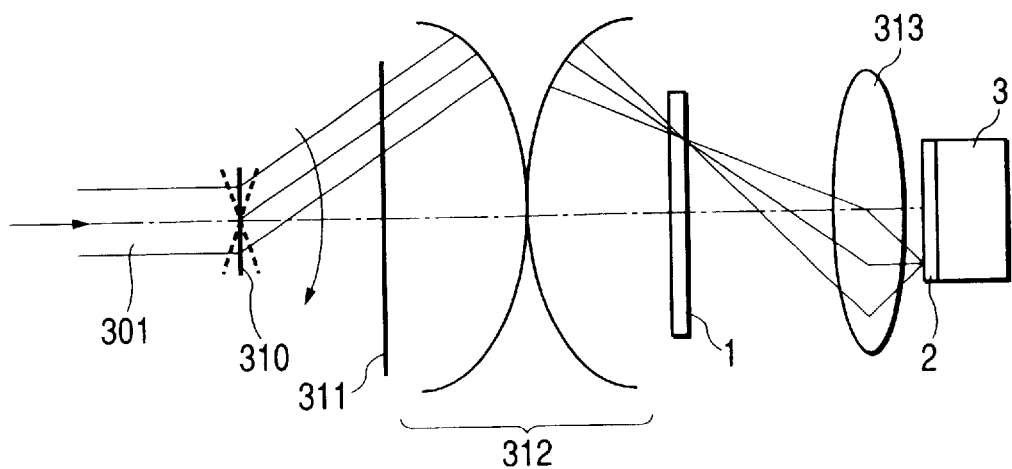
FIG. 4 is a schematic view showing the optical path of a laser working apparatus embodying the present invention.

As shown in FIG. 4 showing the developed optical path for the laser beam, the spherical mirror 312 serves to substantially condense the laser beam 301 on the pattern position of the mask 1 and to guide the laser beam to the projection lens 313.

In a conventional simple optical system for simultaneously focusing and projecting the mask pattern, there is encountered a drawback that, because the irradiating laser beam is coherent with a laterally single mode, the lights diffracted in passing through the mask pattern mutually interfere to generate an interference in the optical image of the mask pattern projected on the surface of the orifice plate, whereby the orifice plate cannot be worked in a shape corresponding to the mask pattern, but, with the above-described scanning of the mask 1 in the present Example, the laser beam does not pass through the entire mask pattern at the same time and the mask pattern is projected in continued manner in time and in an almost random order in working the ink jet head, whereby the worked shape can be prevented from distortion by the speckle interference and can be made same as the mask pattern.

(Example 3)

Figure 5:
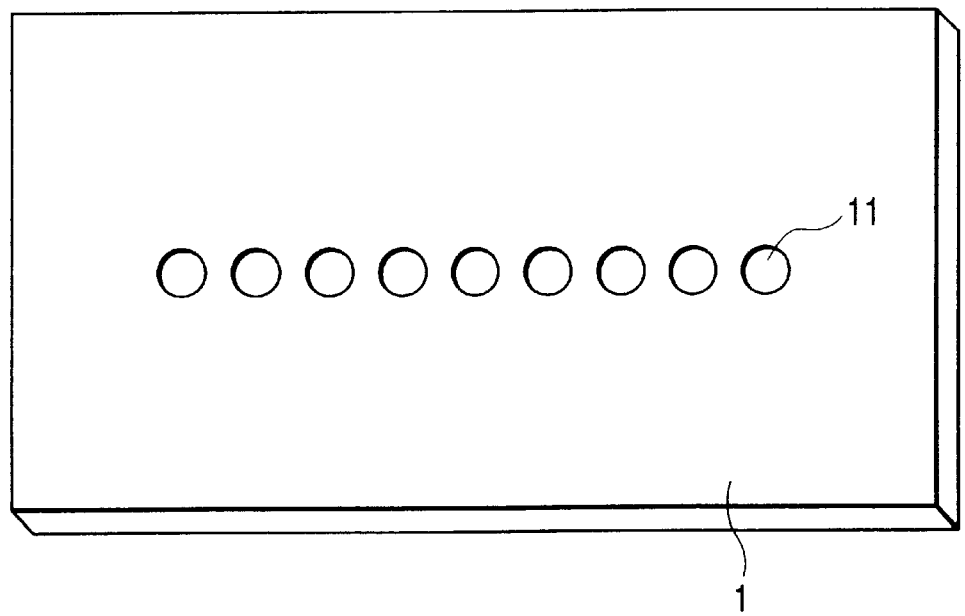
FIG. 5 is a view showing a mask pattern to be employed in a laser working apparatus embodying the present invention.
Figure 6:
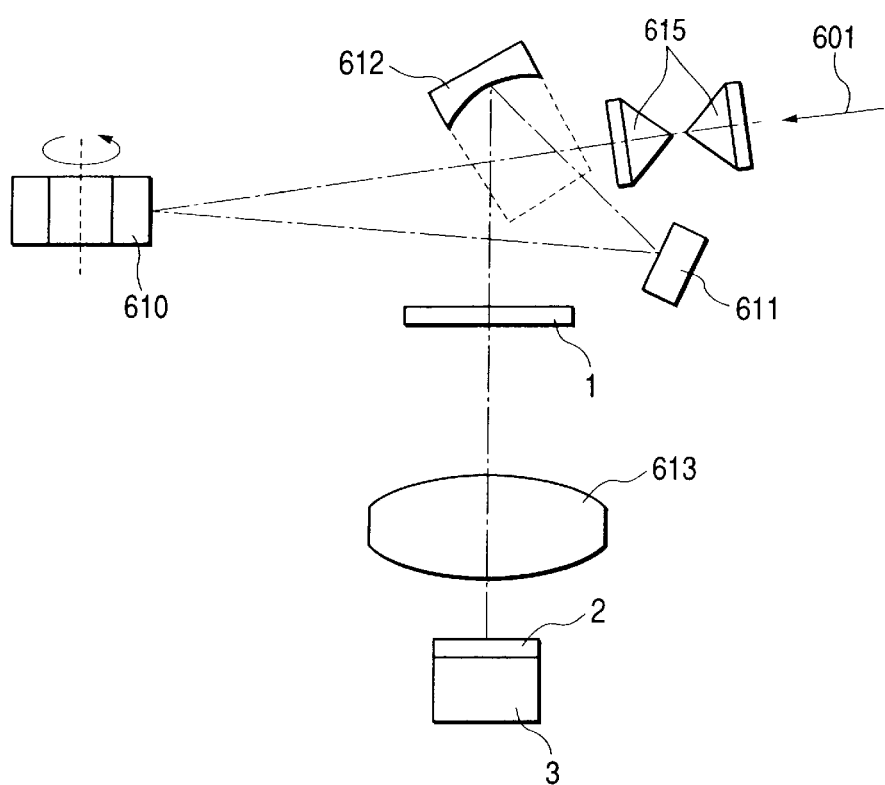
FIG. 6 is a schematic view showing the optical path of a mask pattern projecting optical system in a laser working apparatus of Example 3 of the present invention.
Figure 7:
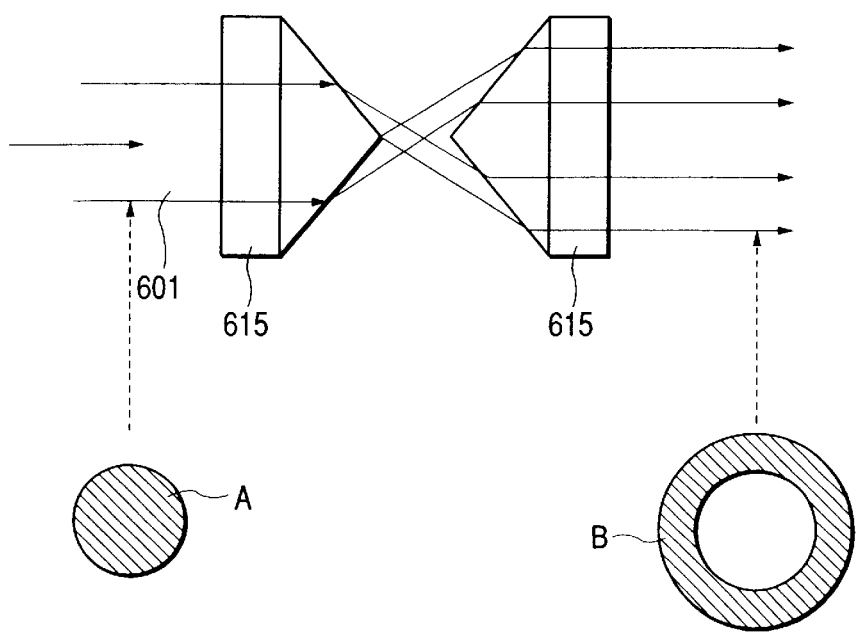
FIG. 7 is a view showing the function of conical lenses in Example 3 of the present invention.

FIG. 6 is a schematic view showing the optical path of a laser working apparatus in Example 3 of the present invention. In the following there will be explained, with reference to FIG. 6, a working method for an ink discharge nozzle of the present Example. Referring to FIG. 6, a laser beam 601 emitted from an unrepresented short-pulsed laser is guided to mutually opposed conical lenses 615 for converting the incident laser beam 601 from a circular beam A into a ring-shaped beam B, as shown in FIG. 7. The ring beam is then guided to a deflecting device 610 including a polygon mirror, wherein the entering laser beam is deflected by the rotary motion, indicated by an arrow, of the polygon mirror. The deflected light beam is reflected by a flat mirror 611 to a concave spherical mirror 612 which reflects and condenses the laser beam substantially on a mask 1, thereby illuminating, by scanning, a mask pattern 11 formed by chromium evaporation and patterning on the mask plate 1 as shown in FIG. 5.

The laser beam transmitted by the mask pattern of the mask 1 is focused and projected by a projection lens 613 onto the surface of an orifice plate 2 of an ink jet head 3 constituting the workpiece, whereby an ink discharge port is worked by laser oscillation. Though there is employed a pulsed laser, the repeated scanning illumination of the mask asynchronous with the laser oscillation averages the mask pattern illumination by integration, thereby obtaining uniform illumination.

Figure 8:
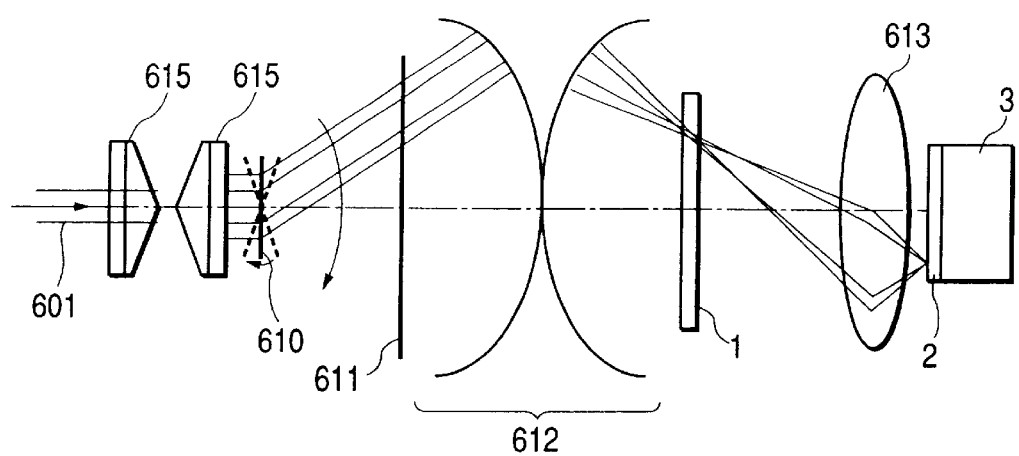
FIG. 8 is a schematic view showing the optical path of the laser working apparatus in Example 3 of the present invention.

As shown in FIG. 8 showing the developed optical path for the laser beam, the spherical mirror 612 serves to substantially condense the laser beam 601 on the pattern position of the mask 1 and to guide the laser beam to the projection lens 613.

Figure 9A:
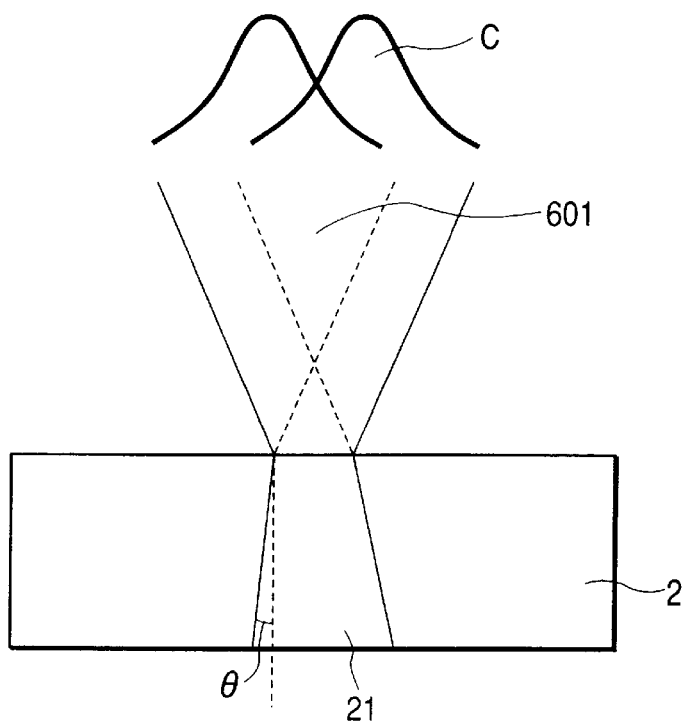
FIGS. 9A and 9B are views showing working characteristics of an orifice plate in Example 3 of the present invention.

In the following there will be explained, with reference to FIGS. 9A and 9B, the influence of the aforementioned ring-shaped beam in forming the ink discharge port on the orifice plate 2. FIG. 9A shows the case of working an ink discharge port 21 on the orifice plate 2 with a conventional circular Gaussian beam, wherein the irradiating laser beam 601, having a light intensity distribution indicated by C, enters corresponding to infinite points in the mask pattern. As the irradiating laser beam has a higher light intensity in a core portion of the beam and a lower light intensity in a peripheral portion, the periphery of the ink discharge nozzle 21 does not receive the irradiation of strong laser beam from the diagonal direction, so that the tapering angle θ becomes small and the inverted tapered shape is difficult to obtain.

Figure 9B:
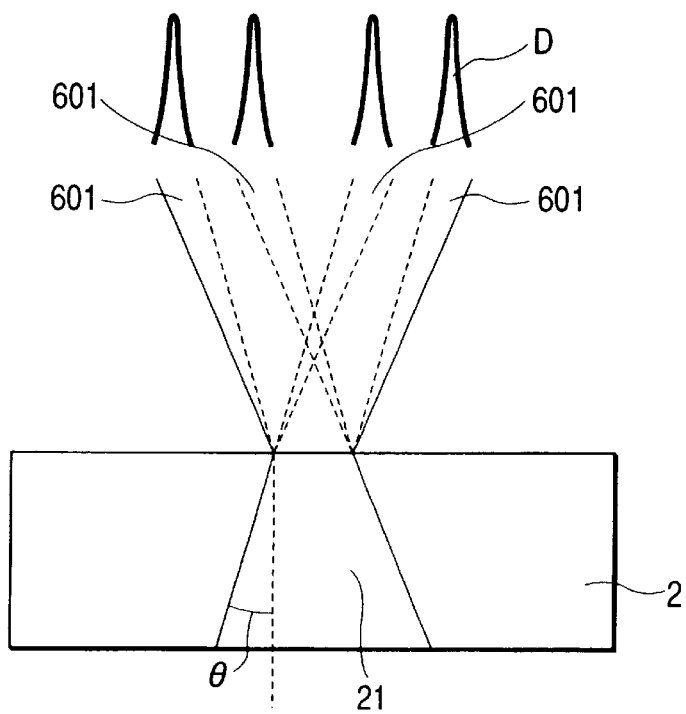

On the other hand, FIG. 9B shows a case of working the ink discharge port 21 in the orifice plate 2 with the ring-shaped beam of the present Example, wherein the irradiating ring-shaped laser beam 601, having a light intensity distribution indicated by D, enters corresponding to infinite points in the mask pattern. The peripheral portion of the ink discharge nozzle 21 receives the irradiation of strong laser beam from the diagonal direction, so that the tapering angle θ becomes large and the inverted tapered shape is easier to obtain.

Also in the present Example shown in FIG. 9B, since the discharge nozzle 21 is formed in an annular pattern, the shape thereof becomes stable and fluctuates less by the fluctuation in the intensity of the laser beam.

(Example 4)

Figure 10:
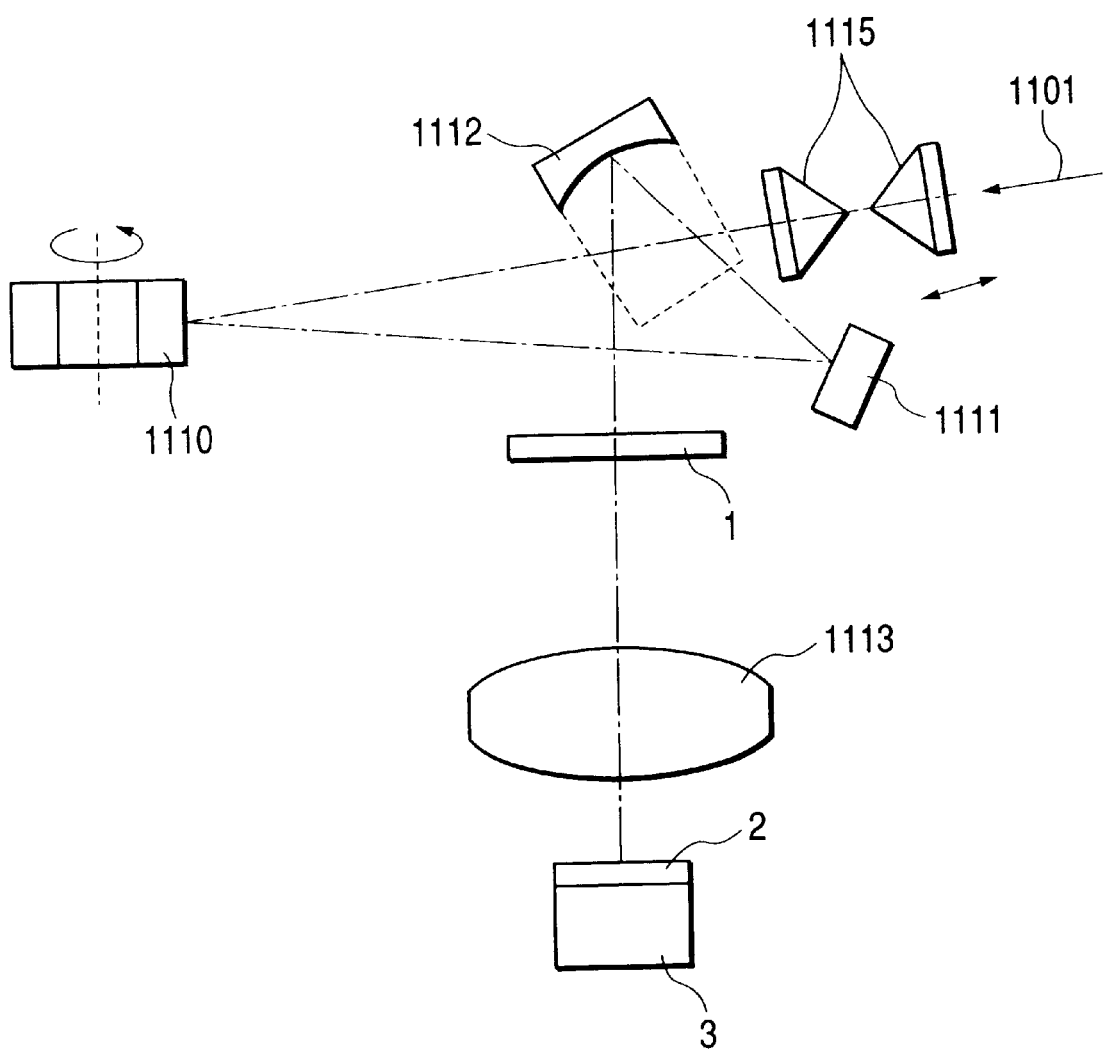
FIG. 10 is a schematic view showing the optical path of a photomask pattern projecting optical system in a laser working apparatus of Example 4 of the present invention.

FIG. 10 is a view showing a working method for the discharge nozzle in Example 4 of the present invention.

Figure 11:
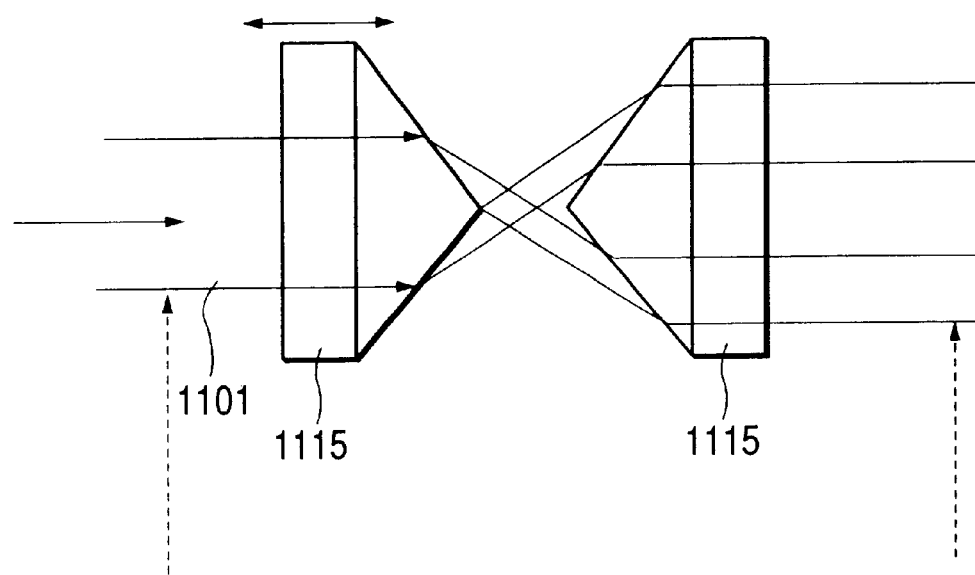
FIG. 11 is a view showing the function of conical lenses in Example 4 of the present invention.

A laser beam 1101 emitted from an unrepresented short-pulsed laser is guided to mutually opposed conical lenses 1115 for converting the incident laser beam 1101 from a circular beam A into a ring-shaped beam B as shown in FIG. 11.

The ring beam is then guided to a deflecting device 1110 including a polygon mirror as shown in FIG. 10, wherein the entering laser beam is deflected by the rotary motion, indicated by an arrow, of the polygon mirror. The deflected light beam is reflected by a flat mirror 1111 to a concave spherical mirror 1112 which reflects and condenses the laser beam substantially on a mask plate 1, thereby illuminating, by scanning, a mask pattern 11 formed by chromium evaporation and pattering on the mask plate 1 as shown in FIG. 5.

The laser beam transmitted by the mask pattern of the mask 1 is focused and projected by a projection lens 1113 onto the surface of an orifice plate 2 of an ink jet head 3 constituting the workpiece, whereby an ink discharge port is worked by laser oscillation.

Though there is employed a pulsed laser, the repeated scanning illumination of the mask asynchronous with the laser oscillation averages the mask pattern illumination by integration, thereby obtaining uniform illumination.

Figure 12:
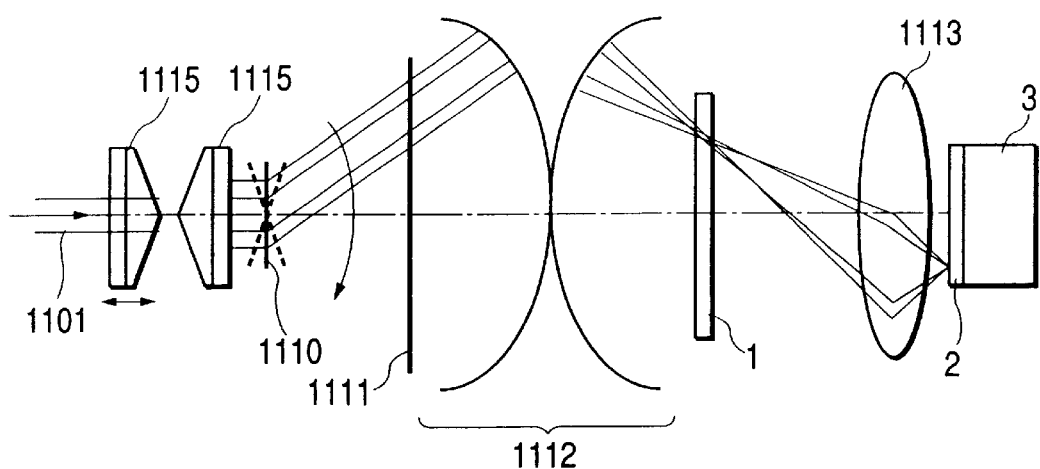
FIG. 12 is a schematic view showing the optical path of a laser working apparatus in Example 4 of the present invention.

As shown in FIG. 12 showing the developed optical path for the laser beam, the spherical mirror 1112 serves to substantially condense the laser beam 1101 on the pattern position of the mask 1 and to guide the laser beam to the projection lens 1113.

In the following there will be explained, with reference to FIGS. 9A and 9B, the influence of the aforementioned ring-shaped beam in forming the ink discharge port on the orifice plate 2. FIG. 9A shows the case of working an ink discharge port 21 on the orifice plate 2 with a conventional circular Gaussian beam, wherein the irradiating laser beam 601, having a light intensity distribution indicated by C, enters corresponding to infinite points in the mask pattern. As the irradiating laser beam has a higher light intensity in a core portion of the beam and a lower light intensity in a peripheral portion, the periphery of the ink discharge nozzle 21 does not receive the irradiation of strong laser beam from the diagonal direction, so that the tapering angle θ becomes small and the inverted tapered shape is difficult to obtain.

On the other hand, FIG. 9B shows a case of forming the ink discharge port 21 in the orifice plate 2 with the ring-shaped beam of the present embodiment, wherein the irradiating ring-shaped laser beam 601, having a light intensity distribution indicated by D, enters corresponding to infinite points in the mask pattern. The peripheral portion of the ink discharge nozzle 21 receives the irradiation of strong laser beam from the diagonal direction, so that the tapering angle θ becomes large and the inverted tapered shape is easier to obtain.

Also in the present Example shown in FIG. 9B, since the discharge nozzle 21 is formed in an annular pattern, the shape thereof becomes stable and fluctuates less by the fluctuation in the intensity of the laser beam.

Also, as shown in FIG. 11, the external shape of the converted ring-shaped beam B can be expanded or contracted from B1 to B2 by moving one of the opposed conical lenses 1115 in the axial direction, as indicated by an arrow, and the ring-shaped beam with thus expanded or contracted external shape provides an effect same as a certain change in the NA (numerical aperture) of the laser beam entering the orifice plate 2, as already explained with reference to FIG. 9B. Consequently, though not illustrated, there is obtained a change in the tapering angle e of the ink discharge nozzle 21 formed in the inversely tapered shape. Thus the tapering angle e of the ink discharge nozzle 21 can be arbitrarily controlled by the change in the distance of the opposed conical lenses 1115.

In the following there will be explained, with reference to FIGS. 13A to 13C, an ink jet recording head in which applied is the discharge port forming methods of the foregoing Examples 1 to 4.

Figure 13A:
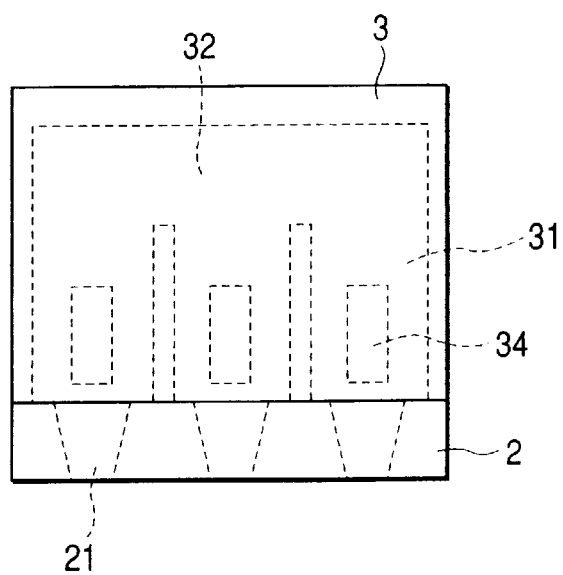
FIGS. 13A, 13B and 13C are schematic views showing an ink jet head produced by the ink jet head producing method in which applied is the working method embodying the present invention.
Figure 13B:
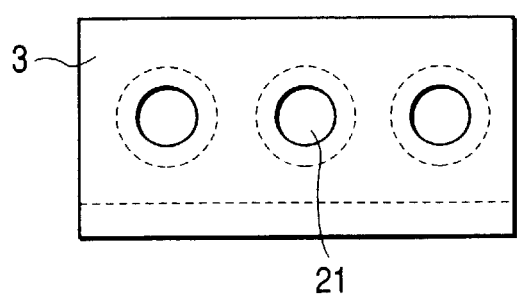
Figure 13C:
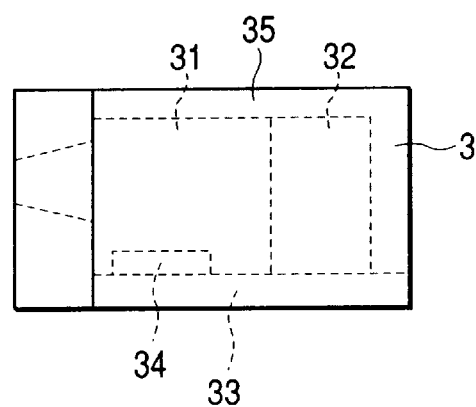

Referring to FIGS. 13A to 13C, a base plate 33 is provided thereon with an ink discharge pressure generating element 34 such as an electrothermal converting element or an electromechanical converting element for ink discharge. The ink discharge pressure generating element is provided in an ink flow path 31 communicating with a discharge port 21, and the individual ink flow paths 31 communicate with a common liquid chamber 32, which is connected to an ink supply pipe (not shown) for ink supply from an ink tank.

A top plate 35 is provided with recesses for forming the ink flow paths 31 and the common liquid chamber 32, and forms such ink flow paths 31 and common liquid chamber 32 upon being adjointed to the base plate 33.

At the end of the ink flow paths in the adjoined body constituted by the base plate 33 and the top plate 35, there is provided an orifice plate 2 having ink discharge ports 21.

The above-described ink jet head can be prepared in the following manner. At first the base plate 33 is prepared by patterning heaters 34 constituting the heat generating resistance elements for generating the ink discharge pressure, unrepresented integrated circuits such as shift registers and electric wirings on a silicon substrate, and the top plate 35 is prepared by forming the recesses to form the ink flow paths 31 and the ink chamber 32 and an unrepresented ink supply aperture by chemical etching of a silicone plate.

Then the base plate 33 and the top plate 35 are aligned and adjoined such that the end faces at the ink discharge side mutually coincide and that the array of the ink flow paths 31 coincides with that of the heaters 34, then the orifice plate 2 in which the nozzles (discharge ports) are not yet formed is adhered to the end faces, at the ink discharge side, of the adjoined top plate and base plate, and the nozzles are formed in this state by the nozzle working method explained in the foregoing.

Then an electric board on which unrepresented terminals for driving the heaters are patterned is connected, and an aluminum base plate is adjoined to the base plate 33. The ink jet head is obtained by combining a holder for supporting the components and an ink tank for ink supply.

In thus prepared ink jet head, all the ink discharge ports are formed with a uniform shape. The ink jet head prepared by the producing method of the present invention, in an actual printing operation, recorded uniformly aligned print dots with a neat and uniform dot shape, thereby providing an image of excellent print quality.

As explained in the foregoing, the present invention is capable of adapting to a higher definition, eliminating the generation of by-products, fundamentally avoiding the accumulation of thermal energy, converted in the course of laser working, in the workpiece composed for example of a resin, also suppressing the interference in the projected image by a simple configuration of effecting the working by scanning illumination of the mask pattern, thereby precisely working the fine mask pattern, and moving the workpiece in a direction perpendicular to the optical axis of the laser beam in synchronization with the movement of the pattern image caused through the projection lens by the movement of the mask, thereby suppressing the speckle interference and enabling highly precise working over a large area while reducing the damage on the mask by the laser beam, whereby enabled is fine working of a complex material or a complex shape such as an IC or a hybrid IC device.

Also the laser working method of the present invention can be applied to the formation of the ink discharge port, ink flow path, ink liquid chamber or ink supply aperture of an ink jet recording head for forming an ink jet recording head of a long ink discharge area, thereby drastically improving the recording performance.

Also the present invention allows to significantly increase energy density in time at the laser working, thereby enabling ablation of the workpiece composed, for example, of a resin, with very limited optical energy.

Also according to the present invention, the by-products at the laser working are scarcely generated, so that the conventionally indispensable step for eliminating the by-products can be dispensed with and the productivity of the ink jet head can be significantly improved.

Also according to the present invention, the working can be completed before the optical energy of the laser beam irradiating the workpiece composed for example of a resin is converted into thermal energy and accumulated in the workpiece, so that the workpiece can be relieved from drawbacks of causing thermal expansion in the course of working to deteriorate the precision of working or causing partial fusion. Therefore highly precise working is made possible to significantly improve the performance of the ink jet head.

Also the ablation working without passing the liquid phase state can be realized not only in the resins but also in the material of high thermal conductivity such as ceramics or metals, since the working process is completed before the thermal diffusion takes place after the light irradiation.

Also the ablation working can be realized in the materials of high optical transmittance such as quartz, optical crystals or glass, utilizing even the slight light absorbance because the energy is highly concentrated in time. Thus there can be increased the freedom of selection of the material constituting the ink jet head. Therefore, there can be employed a high temperature treatment, for example, in the water-repellent treatment of the surface of the ink discharge ports.

Further, the present invention allows to employ a material of a small linear expansion coefficient, thereby avoiding aberration, by the shearing force, in the adjoining face of the components. The ink jet recording head formed with the materials of such low thermal expansion can be prevented from thermal deformation even in the ship transportation in the tropical climate, thereby allowing to reduce the transportation cost.

Also the use of ceramics or glass allows to obtain an ink jet head excellent in durability and storage property capable of withstanding strongly alkaline ink, and the use of a semiconductive material allows to prepare the head structure directly on the integrated circuits.

Furthermore, by laser working from the outer side (ink discharging side) of the orifice plate, the present invention allows to easily form a tapered shape, symmetrical to the axis of ink discharge and pointed toward the end, and to easily form such tapered shape in uniform manner with a large tapering angle. Also in such working operation, the tapering angle of the inversely tapered shape can be arbitrarily controlled by varying the distance of the aforementioned opposed conical lenses. It is thus rendered possible to achieve high quality working and to significantly improve the performance of the ink jet head.

Also the present invention allows to form the ink discharge port of a tapered shape, pointed toward the end, on the outer side of the orifice plate, so that the ink discharge port can be formed in the final step after the ink jet head is assembled, whereby the unevenness in the direction of the ink discharge ports, resulting from deformation in the assembling of the orifice plate, can be resolved. Also as the tapered shape pointed entirely or partially toward the end can be formed on the outer side (ink discharging side) of the orifice plate, it is rendered possible to stabilize the discharging direction of the ink droplets, to reduce the resistance of the ink flow to increase the speed thereof, thereby increasing the ink discharge frequency with a same drive source and also increasing the flying speed of the ink droplets, whereby there can be realized an ink jet head capable of significantly improving print quality and enabling high speed printing.

What is claimed is:

1. A laser working method for conducting laser ablation working on a workpiece by irradiating the workpiece with a laser beam, comprising the steps of:
    in working by projecting a mask pattern with the laser beam, employing a laser beam of plural pulses having a very high energy density in space and time, emitted from a laser oscillator that can oscillate with a pulse radiation time of 1 picosecond or less; and
    forming an integrated image of a speckle interference image on the workpiece and working the workpiece to be in a shape substantially the same as the mask pattern by conducting scanning illumination by relative movement of a source of the laser beam and the mask pattern.

2. The laser working method according to claim 1, wherein the relative movement between the source of the laser beam and the mask pattern is conducted by a reciprocating movement in a direction perpendicular to an optical axis of the laser beam, asynchronously with laser oscillation, and a form of the mask pattern is formed stepwise and in succession on the workpiece.

3. The laser working method according to claim 2, wherein the relative movement between the source of the laser beam and the mask pattern is conducted by moving the mask pattern relative to the laser beam.

4. The laser working method according to claim 3, wherein the mask pattern comprises a rolled film bearing a predetermined pattern, and the movement of the mask pattern is achieved by feeding the rolled film by winding means and rewinding means into an optical path of the laser beam.

5. The laser working method according to claim 3 or 4, wherein the ablation working of the workpiece is conducted by moving the workpiece in a direction perpendicular to an optical axis of the laser beam, in synchronization with movement of a pattern image from a projection lens, resulting from the movement of the mask pattern.

6. The laser working method according to any of claims 1 to 3, wherein a projection magnification of a projection lens which projects the mask is 1/20 or less in absolute value.

7. The laser working method according to claim 2, wherein the relative movement between the source of the laser beam and the mask pattern is conducted by scanning illumination of the mask pattern by the laser beam.

8. The laser working method according to claim 7, wherein the scanning, illumination is conducted by lluminating light comprising the laser beam from the laser oscillator condensed on the mask through a deflection scanning device, asynchronous with the laser oscillation.

9. The laser working method according to claim 8, wherein the laser working is conducted by scanning illumination through an optical system which converts the laser beam from the laser oscillator into a ring-shaped beam.

10. The laser working method according to claim 9, wherein the optical system for converting the laser beam from the laser oscillator into the ring-shaped beam comprises mutually opposed lenses of a conical shape and the distance between the mutually opposed conical lenses is rendered variable in the direction of the optical axis, whereby the external shape of the ring-shaped beam can be expanded or contracted.

11. The laser working method according to claim 1, wherein a wavelength of the laser beam is within a range of 350 to 1000 nm.

12. The laser working method according to claim 1, wherein a pulse radiation time of the laser beam is 500 femtoseconds or less.

13. The laser working method according to claim 1, wherein the workpiece comprises a resin, Si or an Si compound.

14. The laser working method according to claim 1, wherein the laser oscillator is provided with a light propagation space compressing device.

15. The laser working method according to claim 14, wherein the light propagation space compressing device comprises chirping pulse generation means and vertical mode synchronization means utilizing optical wavelength dispersion characteristics.

16. The laser working method according to claim 14, wherein the light propagation space compressing device is composed by a vertical mode synchronization method utilizing optical wavelength dispersion characteristics of a chirping pulse generation means and a diffraction phase grating.

17. A method for producing an ink jet recording head comprising an ink discharge port for discharging ink droplets to be attached to a recording medium, a liquid chamber for holding ink to be supplied to the ink discharge port, an ink flow path communicating the liquid chamber with the ink discharge port, an energy generation element provided in a part of the ink flow path and serving to generate energy for ink discharge, an ink supply aperture for ink supply from the outside to the liquid chamber, in which a member constituting at least a part of the ink flow path is worked by laser ablation working on a workpiece, said method comprising the steps of:

in the laser working, conducted by projecting a mask pattern with a laser beam, employing the laser beam of plural pulses having a very high energy density in space and time, emitted from a laser oscillator that can oscillate with a pulse radiation time of 1 picosecond or less; and forming an integrated image of a speckle interference image on the workpiece and working the workpiece to be in a shape substantially the same as the mask pattern by conducting scanning illumination by relative movement of a source of the laser beam and the mask pattern.

18. The method for producing the ink jet recording head according to claim 17, wherein the relative movement between the source of the laser beam and the mask pattern is conducted by a reciprocating movement in a direction perpendicular to an optical axis of the laser beam, asynchronously with laser oscillation, and a shape of the mask pattern is formed stepwise and in succession on a workpiece.

19. The method for producing the ink jet recording head according to claim 18, wherein the relative movement between the source of the laser beam and the mask pattern is conducted by moving the mask pattern relative to the laser beam.

20. The method for producing the ink jet recording head according to claim 19, wherein the mask pattern comprises a rolled film bearing a predetermined pattern, and the movement of the mask pattern is achieved by feeding the rolled film by winding means and rewinding means into an optical path of the laser beam.

21. The method for producing the ink jet recording head according to claim 19 or 20, wherein the ablation working on the workpiece is conducted by moving the workpiece in a direction perpendicular to the optical axis of the laser beam, in synchronization with movement of a pattern image from a projection lens, resulting from the movement of the mask pattern.

22. The method for producing the ink jet recording head according to any one of claims 17 to 19, wherein a projection magnification of a projection lens which projects the mask pattern is 1/20 or less in absolute value.

23. The method for producing an ink jet recording head according to claim 18, wherein the relative movement between the source of the laser beam and the mask pattern is conducted by scanning illuminator of the mask pattern by the laser beam.

24. The method for producing an ink jet recording head according to claim 23, wherein the scanning illumination is conducted by illuminating light comprising the laser beam from the laser oscillator condensed on the mask through a deflection scanning device, asynchronous with the laser oscillation.

25. The method for producing an ink jet recording head according to claim 24, wherein the laser working is conducted by scanning illumination through an optical system which converts the laser beam from the laser oscillator into a ring-shaped beam.

26. The method for producing an ink jet recording head according to claim 25, wherein the optical system for converting the laser beam from the laser oscillator into the ring-shaped beam comprises mutually opposed lenses of a conical shape and the distance between the mutually opposed conical lenses is rendered variable in the direction of the optical axis, whereby the external shape of the ring-shaped beam can be expanded or contracted.

27. The method for producing the ink jet recording head according to claim 17, wherein the member constituting a part of the ink flow path comprises a recessed portion or a penetrating hole, and the recessed portion or the penetrating hole is simultaneously formed in plural units, each separated from one another by a predetermined distance, by laser beam irradiation through a mask having a pattern of plural apertures formed at a predetermined pitch.

28. The method for producing the ink jet recording head according to claim 27, wherein the recessed portion is a groove to constitute the ink flow path.

29. The method for producing the ink jet recording head according to claim 27, wherein the penetrating hole is to constitute the ink discharge port.

30. The method for producing the ink jet recording head according to claim 17, wherein a wavelength of the laser beam is within a range of 350 to 1000 nm.

31. The method for producing the ink jet recording head according to claim 17, wherein a pulse radiation time of the laser beam is 500 femtoseconds or less.

32. The method for producing the ink jet recording head according to claim 17, wherein a member constituting at least a part of an ink passage including the ink discharge port, ink flow path, liquid chamber and ink supply aperture comprises a resin.

33. The method for producing the ink jet recording head according to claim 17, wherein a member constituting at least a part of an ink passage including the ink discharge port, ink flow path, liquid chamber and ink supply aperture comprises Si or an Si compound.

34. The method for producing the ink jet recording head according to claim 17, wherein the laser oscillator is provided with a light propagation space compressing device.

35. The method for producing the ink jet recording head according to claim 34, wherein the light propagation space compressing device comprises chirping pulse generation means and vertical mode synchronization means utilizing optical wavelength dispersion characteristics.

36. The method for producing the ink jet recording head according to claim 34, wherein the light propagation space compressing device is composed by a vertical mode synchronization method utilizing optical wavelength dispersion characteristics of a chirping pulse generation means and a diffraction phase grating.

* * * * *

UNITED STATES PATENT AND TRADEMARK OFFICE
CERTIFICATE OF CORRECTION

PATENT NO.   : 6,760,973 B1
DATED        : July 13, 2004
INVENTOR(S)  : Jun Koide It is certified that error appears in the above-identified patent and that said Letters Patent is hereby corrected as shown below:

Column 1,
Line 27, "laser. The" should read -- laser.¶ The --;
Line 47, "destructed" should read -- destroyed --; and
Line 66, "excimere" should read -- excimer --.

Column 2,
Line 19, "employed" should read -- be employed --;
Line 45, "precision. However" should read -- precision.¶ However --; and
Line 46, "exciver" should read -- excimer --.

Column 5,
Line 13, "¶¶scanning" should read -- ¶scanning --.

Column 6,
Line 46, "item" should read -- item (17). --; and
Line 47, "(17)." should be deleted.

Column 9,
Line 27, "optical" should be deleted; and
Line 58, "printing. In" should read -- printing¶. In --.

Column 10,
Line 36, "repeatedly" should read -- repeated --.

Column 12,
Line 16, "angle 0" should read -- angle θ --; and
Line 48, "pattering" should read -- patterning --.

Column 13,
Lines 32 and 34, "angle e" should read -- angle θ --; and
Line 53, "adjointed" should read -- adjoined --.

Column 16,
Line 25, "scanning," should read -- scanning-- and "llumi" should read -- illumi- --; and
Line 28, "asynchronous" should read -- asynchronously --.

UNITED STATES PATENT AND TRADEMARK OFFICE
CERTIFICATE OF CORRECTION

PATENT NO. : 6,760,973 B1
DATED : July 13, 2004
INVENTOR(S) : Jun Koide

It is certified that error appears in the above-identified patent and that said Letters Patent is hereby corrected as shown below:

Column 17,
Line 52, ""illuminator" should read -- illumination --; and
Line 58, "asynchronous" should read -- asynchronously --.

Signed and Sealed this

Twenty-eighth Day of June, 2005

JON W. DUDAS
*Director of the United States Patent and Trademark Office*